INVENTOR.
Roy H. Brandes
BY
Herbert Furman
ATTORNEY 3,355,881
GAS PRESSURE CONTROL MEANS FOR A
HOT GAS ENGINE
Roy H. Brandes, Utica, Mich., assignor to General Motors Corporation, Detroit, Mich., a corporation of Delaware
Filed Jan. 24, 1966, Ser. No. 522,553
8 Claims. (Cl. 60—24)

This invention relates generally to external combustion hot gas engines and more specifically to a device for controlling the gas pressure in such an engine.

This invention is applicable to a hot gas engine in which a confined quantity of gas is cycled from a heater, where it is expanded and heated, to a cooler, where it is compressed and cooled. Such engines have a working space for the cycling gas and a gas buffer space which acts as a "shock absorber" for the mechanism. The working and buffer spaces are usually interconnected by a bypass valve to equalize their pressures.

The efficiency of such engines varies with speed and speed control is therefore desirable. It has been previously discovered that engine speed can be effectively controlled by varying the gas pressure. To effect pressure variance, gas is transferred back and forth between the engine and gas storage means. Previous systems for controlling the gas pressure have been ineffective and unduly complex.

It is therefore desirable to combine the various gas pressure controls into one simplified control unit.

One feature of this invention is the provision of a simplified and improved means for controlling the gas pressure in a hot gas engine. Another feature is the elimination of the bypass valve between the working and buffer spaces. Yet another feature is the provision of a single fill valve interconnecting the gas storage means and both the working and buffer spaces. A further feature is the provision of a pair of cooperating valves for controlling the exhaustion of gas from the engine to the storage means. A yet further feature is that the cooperating exhaust valves interconnect the working and buffer spaces upon valve opening to provide pressure equalization. A still further feature is that a speed responsive device is provided to actuate a single lever which adjustably controls the exhaust and fill valve operation.

Additional features and the complete operation of this invention will become readily apparent upon reference to the following specification and the attached drawings in which.

Figure 1:
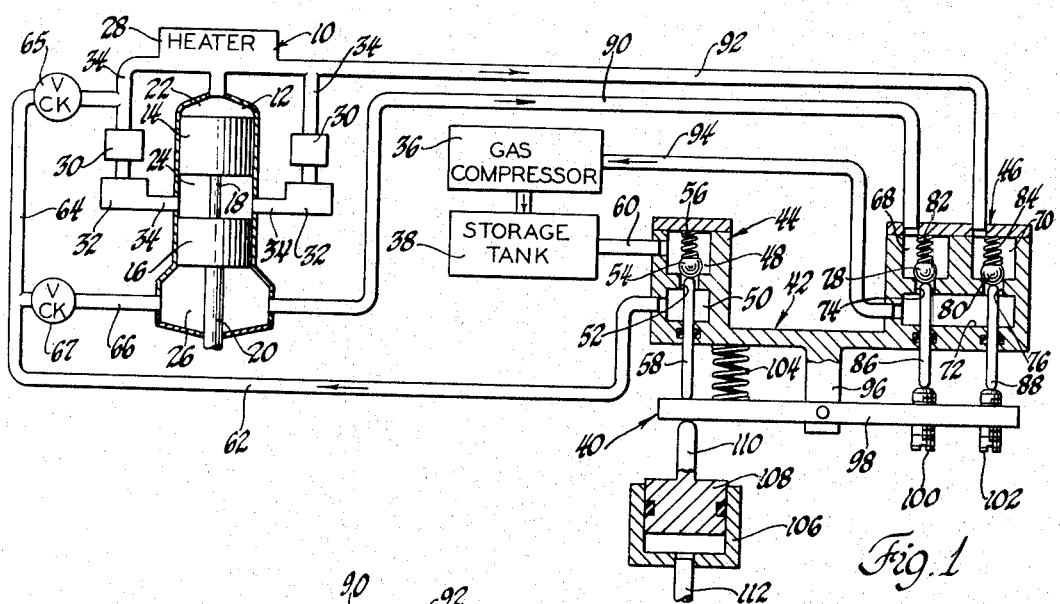
FIGURE 1 is a schematic diagram of a hot gas engine incorporating a gas pressure control device according to this invention, showing the device responding to engine onspeed condition.

Referring now to FIGURE 1, a hot gas engine 10 includes a working cylinder 12 having a displacer piston 14 and a power piston 16 reciprocable therein. The pistons are conventionally arranged, with the displacer piston rod 18 being received concentrically through power piston 16 and power piston rod 20 for connection to a conventional drive mechanism (not shown).

Displacer piston 14 divides cylinder 12 into a hot working space 22 and a cold working space 24. A conventional buffer space 26 is provided beneath power piston 16 to buffer mechanism forces. A confined volume of gas, preferably hydrogen, is cycled from the hot space 22 to the cold space through a conventional heater 28, regenerators 30 and coolers 32 through fluid conduits 34. A more complete description of an engine of this type may be found in Reinhart et al. Patent 3,077,732.

Engine speed is controlled by varying the quantity of gas confined in the engine to regulate power output. Gas is selectively supplied to the engine from, and exhausted from the engine to, gas storage means, comprising a conventional gas compressor 36 and an interconnected storage tank 38. Compressor 36 maintains the gas in tank 38 at a pressure much higher than the engine pressure. An engine speed responsive gas pressure control device 40 is provided to control the supply and exhaustion of gas.

Pressure control device 40 includes a bipartite housing 42 having a fill valve unit 44 and an exhaust valve unit 46. Fill valve unit 44 has an upper chamber 48 and a lower chamber 50 interconnected by a port 52. A ball valve 54 biased by a spring 56 normally closes port 52 and is unseated by an actuator 58. Chamber 48 is connected to storage tank 38 by a conduit 60. Chamber 50 communicates with working spaces 22 and 24 through a conduit 62 and a conduit 64 including a check valve 65. Chamber 50 is also connected to buffer space 26 by conduit 62 and a conduit 66 including a check valve 67.

Exhaust valve unit 46 includes a pair of upper chambers 68 and 70 and a common lower chamber 72 connected thereto by respective ports 74 and 76. A pair of ball valves 78 and 80, biased by springs 82 and 84, normally close ports 74 and 76. A pair of valve actuators 86 and 88 are provided for unseating ball valves 78 and 80. Chamber 68 is connected to buffer space 26 by a conduit 90. A conduit 92 connects working spaces 22 and 24 with chamber 70. A conduit 94 interconnects chamber 72 and compressor 36.

A depending fulcrum 96 on housing 42 pivots a lever 98, the left end of which engages actuator 58. Lever 98 includes a pair of adjustable contacts or set screws 100 and 102 which engage actuators 86 and 88, respectively. Lever 98 is biased into engagement with actuators 86 and 88 by a coil spring 104. A speed responsive device comprising a cylinder 106, a piston 108 and a contact arm 110 positions lever 98 in opposition to spring 104. A conventional engine actuated fluid pressure device (not shown) transmits fluid pressure in inverse proportion to engine speed to cylinder 106 through a conduit 112. Lever 98 is thus accurately positioned in response to engine speed to control the operation of the ball valves.

Figure 2:
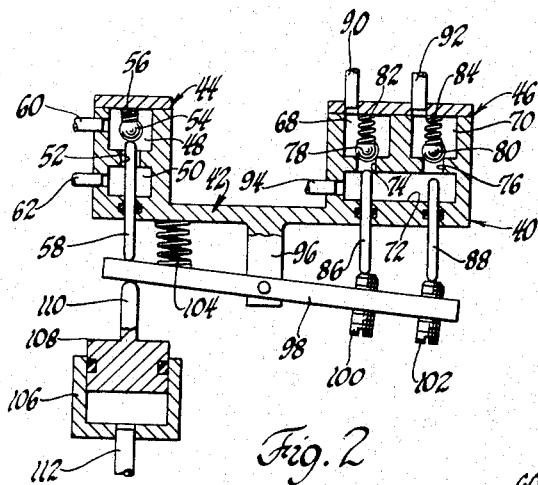
FIGURE 2 is a view of the gas pressure control device responding to engine underspeed condition.

When the engine is onspeed, or operating within the desired speed range, device 40 assumes the position of FIGURE 1 in which all valves are closed and the engine operates on a confined quantity of gas. If the engine underspeeds, or its speed falls below the desired range due to loss of gas or a change in load, an increased pressure signal is transmitted to cylinder 106. This forces piston 108 upwardly to rotate lever 98 clockwise to its position shown in FIGURE 2. Actuator 58 is moved upwardly to unseat valve 54 and permit additional gas to flow to the engine from storage tank 38 through fluid transfer means comprising conduits 60, 62, 64 and 66. The additional gas increases engine power and elevates engine speed to within the desired range. The speed increase reduces pressure in cylinder 106 and spring 104 returns device 40 to its position of FIGURE 1 to permit spring 56 to seat valve 54.

Figure 3:
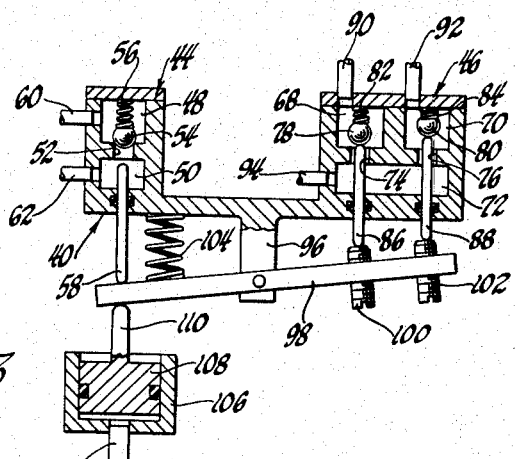
FIGURE 3 is a view of the gas pressure control device responding to engine overspeed condition.

If the engine overspeeds, or its speed exceeds the desired range because of a loss of load or other reasons, a decreased pressure signal is transmitted to cylinder 106. As shown in FIGURE 3, the reduced opposition to spring 104 permits the spring to bias lever 98 counterclockwise and cause actuators 86 and 88 to unseat valves 78 and 80. Gas is then exhausted from the engine to storage tank 38 by fluid transfer means comprising conduit 90, 92, 94 and compressor 36. This loss of gas effects an engine power loss and reduces speed to within the desired range. This speed decrease increases pressure in cylinder 106 and causes piston 108 to overcome spring 104 and return lever 98 to its position of FIGURE 1. This permits springs 82 and 84 to seat valves 78 and 80.

Equalization of pressures in the buffer space 26 and the working spaces 22 and 24 is accomplished during engine overspeed when valves 78 and 80 are open. As shown in FIGURE 3, the working and buffer spaces communicate through conduits 90 and 92, and chambers 68, 70 and 72. Thus the need for a separate gas bypass valve between the working and buffer spaces is eliminated.

The check valves 65 and 67 are provided to prevent the backflow of gas from the working and buffer spaces to the storage tank through conduits 62, 64 and 66. The speeds at which valves 54, 78 and 80 open may be varied by adjusting set screws 100 and 102 and by adjusting the position of piston 108.

This invention thus provides a simplified gas pressure control device having only three valves controlled by a single speed responsive mechanism. The separate bypass valve between the working and buffer spaces is eliminated, this function being served by the unique valving arrangement.

While only a preferred embodiment of this invention is shown and described, modifications thereof are contemplated within the scope of this invention.

I claim:
1. In a hot gas engine having a working space, a buffer space and gas storage means, gas pressure control means comprising first means interconnecting the storage means and each of the working and buffer spaces for transferring gas therebetween, first valve means controlling the first means, second means interconnecting the working space and the storage means for transferring gas therebetween, second valve means controlling the second means, third means interconnecting the buffer space and the storage means for transferring gas therebetween, third valve means controlling the third means, and engine speed responsive means for selectively operating the valve means to vary the quantity of gas in the working and buffer spaces to maintain engine speed within a desired range.

2. The gas pressure control means as recited in claim 1, wherein the speed responsive means operate the first valve means upon engine underspeed to interconnect the storage means and each of the working and buffer spaces.

3. The gas pressure control means as recited in claim 1, wherein the speed responsive means operate the second and third valve means upon engine overspeed to interconnect the working space and the storage means and to interconnect the buffer space and the storage means.

4. The gas pressure control means as recited in claim 1, wherein the second and third valve means cooperate upon operation to interconnect the working and buffer spaces.

5. The gas pressure control means as recited in claim 1, wherein the speed responsive means is movable between a first position operating the first valve means, a second position operating the second and third valve means, and an intermediate nonoperating position.

6. The gas pressure control means as recited in claim 5, wherein the speed responsive means includes means biasing the control means into its second position and an engine speed responsive device opposing the biasing means.

7. The gas pressure control means as recited in claim 6, wherein each of the valve means includes a valve member, a valve seat, a valve actuator and biasing means normally seating the valve, and the speed responsive means includes a control means for the valve actuators.

8. The gas pressure control means as recited in claim 6 wherein the speed responsive device and the biasing means cooperate to position the control means in its intermediate position when the engine speed is maintained within its desired range.

No references cited.

MARTIN P. SCHWADRON, *Primary Examiner.*

ROBERT R. BUNEVICH, *Examiner.*